United States Patent Office 3,360,509
Patented Dec. 26, 1967

3,360,509
WATER-SOLUBLE AZO DYESTUFFS CONTAINING HALOGENATED CYCLOBUTYL- AND CYCLO-BUTENYL-CARBONYLAMINO GROUPS
Otto Scherer, Bad Soden, Taunus, and Klaus Uhl, Hofheim, Taunus, Germany, assignors to Farbwerke Hoechst Aktiengesellschaft vormals Meister Lucius & Brüning, Frankfurt am Main, Germany, a corporation of Germany
No Drawing. Filed Feb. 19, 1965, Ser. No. 434,122
Claims priority, application Germany, Feb. 28, 1964, F 42,146
6 Claims. (Cl. 260—163)

ABSTRACT OF THE DISCLOSURE

Water-soluble, fiber-reactive azo dyestuffs containing, as reactive groupings, at least one of the moieties

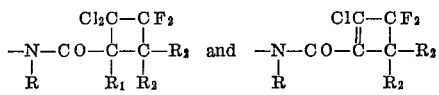

in which $R_1$ is hydrogen or chlorine, $R_2$ is hydrogen or lower alkyl and R is hydrogen or methyl, said dyestuffs being suitable for the dyeing or printing of cellulosic or protein-containing fibrous materials.

---

The present invention provides water-soluble azo dyestuffs and a process for their manufacture; in particular it provides azo dyestuffs of one of the general Formulae 1 and 2

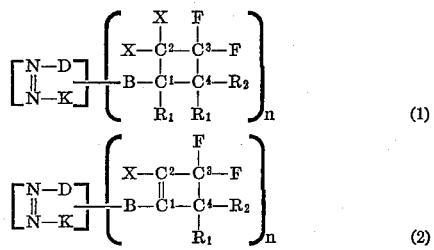

in which D represents the radical of a diazo component and K represents the radical of a coupling component; D and/or K may contain one or several groups imparting solubility in water and one or several azo groups; $R_1$ and $R_2$ represent hydrogen or chlorine atoms or carboxylic acid, cyano, nitro or sulphonic acid groups or the groupings —R′, —OR′, —COOR‴, —SO$_2$—NR′R″, —SO$_2$—R′ or —CO—NR′R″, and the two substituents $R_1$ may together represent a further carbon linkage between the carbon atoms $C_1$ and $C_4$. In the above-mentioned groupings, R′ and R″ stand for hydrogen atoms or alkyl or aryl groups, R‴ represents an alkyl or an aryl group, X stands for a hydrogen atom or a halogen atom, preferably a chlorine atom, B represents one of the groupings —CO—NR′—, —SO$_2$—NR′—,

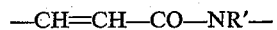

—CHR′—CHR″—CO—NR′— or alkylene—NH—, R′ and R″ having the meanings given above, and n stands for a number within the range of 1 to 5.

Now we have found that interesting, water-soluble azo dyestuffs of the afore-mentioned Formulae 1 and 2 can be prepared by coupling a diazonium compound of a primary aromatic amine of one of the general Formulae 3 and 4

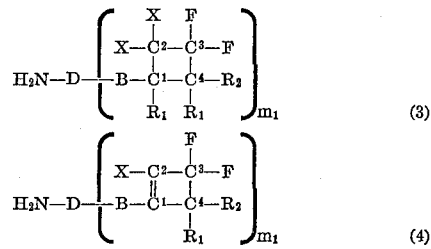

with a coupling component of one of the general Formulae 5 and 6

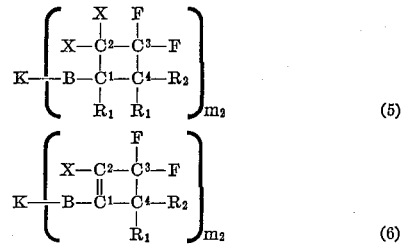

in which formulae $R_1$, $R_2$, X, B, D and K have the meanings given above and $m_1$ and $m_2$ are numbers within the range of 0 to 5, the sum of $m_1$ and $m_2$ being at least 1 and at most 5, at a temperature within the range of about 0° C. to about 120° C., preferably of about 10° C. to about 80° C., in an aqueous or aqueous-organic medium, at a pH within the range of about 3 to 10, preferably about 5 to 8.5.

The optimum temperature for the coupling and the pH range which is suitably maintained have to be adjusted for the reactants used in each individual case, especially for the coupling components. Whether the diazo and the coupling components are combined in a purely aqueous or in an aqueous-organic medium likewise depends on the compounds to be coupled, for example, on their solubility properties.

The diazonium compounds of the primary amines of the general Formulae 3 or 4 are prepared in known manner at a temperature within the range of about −10° to about +30° C., preferably within the range of about 0° to about 20° C., in an aqueous solution at a pH range of about 1 to about 4, suitably with the use of an about 0.5 N— to about 8 N—, preferably about 1 N— to about 5 N— sodium nitrite solution. The optimum temperature to be applied in each individual case depends upon the reactants used.

The primary aromatic amines from which the diazo components to be reacted according to the process of the present invention are prepared are principally of the benzene and naphthalene series. The following amines may be mentioned by way of example:

aminobenzene,
1-amino-2-methylbenzene,
1-amino-3-methylbenzene,
1-amino-2,5-dimethylbenzene,
1-amino-2-methoxybenzene,
1-amino-3-methoxybenzene,
1-amino-2,5-dimethoxybenzene,
1-amino-3-methyl-6-methoxybenzene,
1-aminobenzene-2-sulphonic acid, 1-aminobenzene-3-sulphonic acid,
1-aminobenzene-4-sulphonic acid,
1-aminobenzene-2,5-disulphonic acid,
1-trifluoromethyl-3-aminobenzene-6-sulphonic acid,
1-methyl-2-chloro-4-aminobenzene-5-sulphonic acid,
1-methyl-2-chloro-5-aminobenzene-4-sulphonic acid,
1-amino-3-acetylaminobenzene-6-sulphonic acid,
1-amino-4-acetylaminobenzene-2-sulphonic acid,
1-amino-3,4-dichlorobenzene-6-sulphonic acid,
1-amino-2,4-dimethoxybenzene-6-sulphonic acid,
1-methyl-4-aminobenzene-5-sulphonic acid,
1-methyl-3-aminobenzene-4-sulphonic acid,
1-methoxy-4-aminobenzene-5-sulphonic acid,
1-methoxy-3-aminobenzene-4-sulphonic acid,
1-hydroxy-4-aminonaphthalene-3-sulphonic acid,
1-aminonaphthalene-6-sulphonic acid,
1-aminonaphthalene-7-sulphonic acid,
1-aminonaphthalene-4-sulphonic acid,
1-amino-2-hydroxynaphthalene-4-sulphonic acid,
1-aminonaphthalene-3,6-disulphonic acid,
1-(2',2'-dichloro-3',3'-difluorocyclobutyl-carbonylamino)-3-aminobenzene-5-sulphonic acid,
1-(1',2',2'-trichloro-3',3'-difluorocyclobutyl-carbonyl-amino)-2-methyl-5-aminobenzene-4-sulphonic acid,
1-(2'-chloro-3',3'-difluorocyclobutene-1,yl-carbonyl-amino)-2-methyl-5-aminobenzene-3-sulphonic acid,
1-(2',2'-dichloro-3',3'-difluorocyclobutyl-carbonylamino)-2-methyl-3-aminobenzene-5-sulphonic acid,
2-chloro-1-(2'-chloro-3',3'-difluorocyclobutene-1-yl-carbonylamino)-3-aminobenzene-5-sulphonic acid,
6-nitro-1,(1',2',2'-trichloro-3',3'-difluorocyclobutylcarbonylamino)-3-aminobenzene-4-sulphonic acid and
2-chloro-1-(2',2'-dichloro-3',3'-difluorocyclobutyl-carbonylamino)-4-aminobenzene-6-sulphonic acid.

Coupling components to be used according to the process of the present invention may be aromatic hydroxy compounds coupling in o-position to a hydroxy group and aliphatic or heterocyclic, enolised or enolisable hydroxy compounds, and, moreover, amines coupling in p-position to the amino group. Ase compounds of this kind the following are named by way of example:

phenol,
methoxyphenol,
1-hydroxybenzene-2-sulphonic acid,
1-hydroxybenzene-3-sulphonic acid,
1-hydroxybenzene-4-sulphonic acid,
1-amino-3-hydroxynaphthalene-4-sulphonic acid,
1-amino-3-hydroxynaphthalene-6-sulphonic acid,
1-amino-5-hydroxynaphthalene-6-sulphonic acid,
1-amino-3-hydroxynaphthalene-7-sulphonic acid,
1-amino-8-hydroxynaphthalene-3,6-disulphonic acid,
2-hydroxynaphthalene-6,8-disulphonic acid,
2-hydroxynaphthalene-3,6-disulphonic acid,
1,8-dihydroxynaphthalene-3,6-disulphonic acid,
1-amino-8-hydroxynaphthalene-4-sulphonic acid,
2-amino-8-hydroxynaphthalene-6-sulphonic acid,
3-amino-8-hydroxynaphthalene-6-sulphonic acid,
1-acetylamino-8-hydroxynaphthalene-3,6-disulphonic acid,
3-methyl-1-(4'-sulphophenyl)-pyrazolone-(5),
1-(4'-sulphophenyl)-5-pyrazolone-3-carboxylic acid,
acetoacetylaminobenzene,
1-acetoacetylamino-2-chlorobenzene,
1-methyl-4-acetoacetylaminobenzene,
1-acetoacetylamino-2-chlorobenzene,
1-[p-2',2'-dichloro-3',3'-difluorocyclobutyl-carbonyl-amino)]-phenyl-5-pyrazolone-3-carboxylic acid,
1-chloro-2-(2',2'-dichloro-3',3'-difluorocyclobutyl-carbonylamino)-5-hydroxynaphthalene-7-sulphonic acid,
1-(2'-chloro-3',3'-difluorocyclobutene-1-yl-carbonyl-amino)-3-hydroxynaphthalene-6-sulphonic acid and
2-(1',2',2'-trichloro-3',3'-difluorocyclobutyl-carbonyl-amino)-5-hydroxynaphthalene-1-sulphonic acid.

For carrying out the process in an aqueous-organic medium water-soluble, inert organic solvents, such as for example, acetone, dimethylformamide, lower alkanols, glycols or dioxane may be used.

When fibrous materials of native or regenerated cellulose, for example, cotton, linen, hemp, artificial wool or rayon, or of native or regenerated protein fibres, for example, wool or silk, are dyed or printed with the dyestuffs obtained according to the invention dyeings and prints of very good fastness properties are obtained.

The dyeings are advantageously prepared by impregnating the fibrous material with the dyestuffs in the presence of an agent having an alkaline reaction or by dyeing it with a dilute dye liquor likewise in the presence of an agent having an alkaline reaction. If the dyestuff has no or no pronounced affinity for the fibrous material it is advantageous to impregnate the fibrous material in the cold or at a moderately elevated temperature with an aqueous, if desired or required salt-containing, solution of the dyestuff and then to squeeze off the liquid. The dyestuff solutions may contain mineral salts, for example, alkali metal chlorides or alkali metal sulphates. As agents having an alkaline reaction there are preferably used inorganic compounds such as alkali or alkaline earth metal hydroxides, alkali metal bicarbonates, alkali metal carbonates, alkali metal phosphates, for example, trisodium phosphate or mixtures of disodium phosphate and trisodium phosphate, alkali metal borates or alkali metal salts of trichloroacetic acid or mixtures of such agents.

The dyestuffs which have thus been applied to the fibrous material are fixed after the impregnation. The impregnated material is subjected to a heat treatment which, if desired or required, is carried out after an intermediate drying. The heat treatment is brought about by steaming the material in a current of heated air or in an organic solvent. When, for example, alkali metal hydroxides are used the fixation can be brought about already by abandoning the impregnated material for several hours in the cold or at a moderately elevated temperature.

When impregnation baths are used which do not contain an agent having an alkaline reaction the impregnated material is advantageously introduced into a salt-containing alkaline bath and then subjected to a heat treatment. An appropriate combination of temperature and pH-value and an appropriate choice of the alkalis enable the fixation to be carried out even during the dyeing operation.

The dyestuffs obtained according to the invention may also be applied to the fibrous material by a textile printing process. For the purpose of preparing printing colours the dyestuffs are dissolved in water, in the presence of a dispersing agent, if desired or required, while generally used auxiliary agents, for example, hygroscopic substances or solution promoters such as urea, acetamide or dimethyl sulphoxide, are added. The resulting solution is then mixed by stirring with a thickener, for example, methyl cellulose, starch ether, alginates or emulsion thickenings (oil-in-water or water-in-oil emulsions which may contain another thickening). To the resulting pastes the above-mentioned alkalis are added and the material is printed in usual manner. The fixation is then brought about by a heat treatment by means of steam, carried out, for example, for 5 to 10 minutes at a temperature within the range of 101° to 105° C., or for about 0.05 to 1 minute at a temperature within the range of 145° to 150° C., or by a dry heat treatment carried out for several minutes, for example, at a temperature within the range of 120° to 150° C., or for about 0.5 to 1 minute at a temperature within the range of 190° to 220° C.

The aforesaid temperatures and fixation periods may be modified according to the nature and quantity of the alkali used.

The fibrous material may also be printed with practically neutral or even weakly acid printing pastes which do not contain an agent having an alkaline reaction. In this case the fibrous mtaerial has to be treated with an agent having an alkaline reaction either before or after the printing operation. The fixation of the dyestuffs is likewise brought about by a treatment with steam or by the action of heat, the fixation period and temperature depending on the kind and quantity of the alkali used.

The fixation may also be brought about without steaming by passing the material for a short time through a hot, salt-containing alkaline solution.

The following examples serve to illustrate the invention but they are not intended to limit it thereto, the parts and percentages being by weight unless otherwise stated and the relationship of parts and percentages by weight to parts and percentages by volume being the same as that of the kilogram to the litre.

*Example 1*

20 parts of 1,4-diaminobenzene-2-sulphonic acid of 94% strength were adjusted to pH 8 by the addition of an aqueous 2 N-sodium carbonate solution. Then 22.3 parts of 2,2-dichloro-3,3-difluorocyclobutane carboxylic acid chloride-1 which was dissolved in 50 parts by volume of acetone were added dropwise at room temperature and the pH was maintained within the range of 7.5 to 8 by simultaneously adding further drops of 2 N-sodium carbonate solution. After the addition of 50 parts by volume of a 2 N-sodium nitrite solution the mixture was added dropwise, while cooling, to a mixture of 60 parts by volume of concentrated hydrochloric acid and 65 parts by volume of water, the addition being brought about in such a manner that the temperature did not exceed 3° C.

In a reaction vessel 32.6 parts of 1-(4'-sulphonaphthyl)-3-methyl-5-pyrazolone were adjusted to pH 8 by the addition of a 2 N-sodium carbonate solution and the diazonium compound which had been prepared as described above was added. Simultaneously a 2 N-sodium carbonate solution was added in such an amount that the pH- value remained within the range of 6.5 to 7. Stirring was continued for one hour at room temperature. The mixture was acidified with a small quantity of glacial acetic acid until its pH-value was 4. By salting out with sodium chloride the dyestuff of the formula

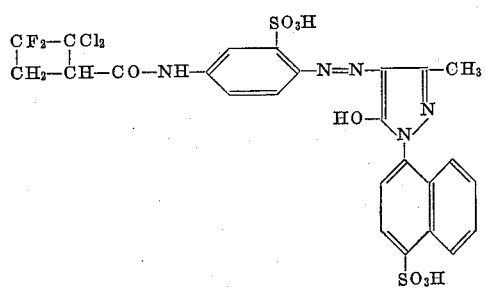

was obtained. From an alkaline bath it produced on cotton a reddish yellow dyeing which had a very good fastness to wetting.

When printing a cotton fabric with a printing colour which contained sodium bicarbonate as an alkali in addition to the dyestuff, steaming the printed fabric in a Mather-Platt, rinsing and soaping as usual, a reddish yellow print of good fastness to wetting was obtained.

*Example 2*

22.6 parts of 1,3-diaminobenzene-4-sulphonic acid of 83.3% strength were acylated with 18.6 parts of 2-chloro-3,3-difluorocyclobutene carboxylic acid chloride-1 in the manner described in Example 1. They were then diazotized likewise in the manner described in Example 1 and coupled with 30.6 parts of 1-(4'-sulphophenyl)-5-pyrazolone-3-carboxylic acid. A dyestuff of the formula

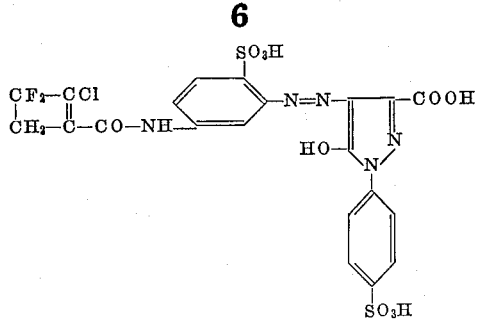

was obtained. From an alkaline bath it produced on cotton a greenish yellow dyeing which had a very good fastness to wetting.

When using the sodium salt of trichloroacetic acid as an alkali, printing a cotton fabric with the dyestuff which was fixed by steaming in a Stern steamer for 25 minutes and subjecting the material to the usual aftertreatment, a greenish yellow print of very good fastness to wetting was obtained.

*Example 3*

22.6 parts of 1,3-diaminobenzene-4-sulphonic acid of 83.3% strength were reacted under the conditions described in Example 1 with 25.7 parts of 1,2,2-trichloro-3,3-difluorocyclobutane carboxylic acid chloride-1, diazotized and coupled with 17.7 parts of acetic acid anilide. A dyestuff of the formula

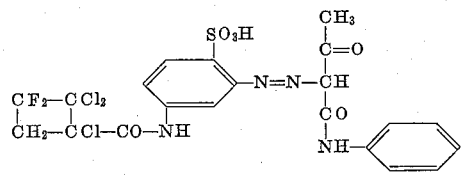

was obtained. From an alkaline bath it produced on cotton a greenish yellow dyeing of good fastness to wetting.

When printing a fabric of viscose rayon with a printing paste which contained urea and sodium bicarbonate as an alkali in addition to the dyestuff, steaming it in a Mather-Platt and then treating it in the usual manner, a greenish yellow print of good fastness to washing was obtained.

*Example 4*

20 parts of 1,4-diaminobenzene-2-sulphonic acid of 94% strength were acylated with 22.3 parts of 2,2-dichloro-3,3-difluorocyclobutane carboxylic acid chloride-1 under the conditions described in Example 1. The acylated product was then diazotized and coupled with 10 parts of barbituric acid. A dyestuff of the formula

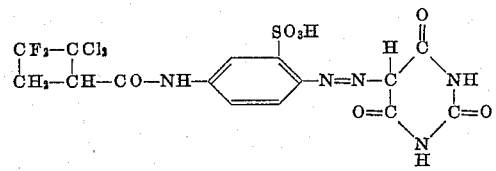

was obtained. From an alkaline bath it produced on cotton a yellow dyeing of good fastness to wetting.

When printing a neutral printing paste on a cotton fabric, passing the printed fabric at room temperature through an alkaline padding bath containing sodium hydroxide solution, sodium carbonate and/or potassium carbonate and sodium chloride, fixing the dyestuff by steaming in a two phase steamer for 20 seconds and finishing in the usual manner, a yellow print of good fastness to wetting was obtained.

*Example 5*

22.6 parts of 1,3-diaminobenzene-4-sulphonic acid of 83.3% strength were reacted in the manner described in Example 1 with 25.7 parts of 1,2,2-trichloro-3,3-difluorocyclobutane carboxylic acid chloride-1. The reaction product was diazotized in known manner with hydrochloric acid and sodium nitrite solution and coupled with 30 parts of 1-hydroxynaphthalene-3,6-disulphonic acid. A dyestuff of the formula

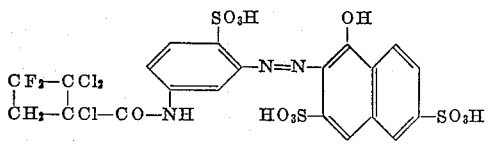

was obtained. From an alkaline bath it produced on artificial wool an orange-coloured dyeing of very good fastness to wetting.

When printing a cotton fabric in the presence of sodium carbonate, heat-setting the dyestuff at 120° C. and continuing the treatment in the usual manner, an orange-coloured print of good fastness properties was obtained.

*Example 6*

20 parts of 1,4-diaminobenzene-2-sulphonic acid of 94% strength were reacted in the manner described in Example 1 with 18.6 parts of 2-chloro-3,3-difluorocyclobutane carboxylic acid chloride-1. The resulting sodium salt of 4-(2'-chloro-3',3'-difluorocyclobutene-1-yl-carbonylamino)-1-aminobenzene-2-sulphonic acid was diazotized in known manner and the diazo compound that was thus obtained was coupled with 39 parts of 1-acetylamino-8-hydroxynaphthalene-3,6-disulphonic acid of 61.3% strength at a pH-value of 4.5 to 5.5. A dyestuff of the formula

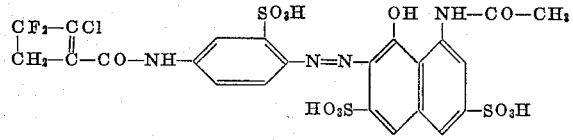

was obtained. From an alkaline bath it produced on cotton a bluish red dyeing of very good fastness to wetting.

When using sodium bicarbonate as an alkali, printing a tissue of viscose rayon and fixing the dyestuff by steaming in a Mather-Platt, a bluish print of good fastness to washing was obtained.

*Example 7*

22.9 parts of 1-(3'-aminophenyl)-5-pyrazolone-3-carboxylic acid of 91.6% strength were adjusted to pH 8 by the addition of 2 N-sodium carbonate solution. Then 22.3 parts of 2,2-dichloro-3,3-difluorocyclobutane carboxylic acid chloride-1 which were dissolved in 50 parts by volume of acetone and 2 N-sodium carbonate solution were added dropwise in such an amount that the pH value remained within the range of 7.5 to 8.

24.6 parts of 1-aminobenzene-2-sulphonic acid of 70% strength were converted with 2 N-sodium carbonate solution into the sodium salt. After the addition of 50 parts by volume of 2 N-sodium nitrite solution, the mixture was added dropwise to 100 parts by volume of hydrochloric acid of 30% strength, the mixture being added in such a manner that by means of an exterior cooling the diazotation temperature did not exceed 3° C. The diazo solution which had thus been obtained was added dropwise to the coupling component which had been prepared as described above. By the simultaneous addition of 2 N-sodium carbonate solution the pH value was maintained within the range of 6.5 to 7. Stirring was continued for one hour at room temperature and the whole was acidified to pH 5 by means of glacial acetic acid. By salting out with 75 parts of sodium chloride a dyestuff of the formula

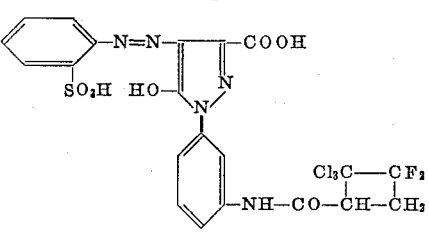

was obtained. From an alkaline bath it produced on cotton a reddish yellow dyeing of very good fastness to wetting.

When printing a cotton fabric with a printing paste which contained sodium carbonate as an alkali and acetamide in addition to the dyestuff and fixing the dyestuff in a Mather-Platt, a reddish yellow print of very good fastness to wetting was obtained.

*Example 8*

18.6 parts of 2-chloro-3,3-difluorocyclobutene-1-yl-carboxylic acid chloride-1 dissolved in 50 parts by volume of acetone were added dropwise to 10.8 parts of 3-methyl-1-aminobenzene dissolved in 50 parts by volume of acetone. Simultaneously an aqueous 2 N-sodium carbonate solution was added in such an amount that the pH value remained within the range of 7.5 to 8.

After rendering the mixture acid to Congo paper by means of concentrated hydrochloric acid it was coupled with the diazonium compound of 2-aminonaphthalene-4,8-disulphonic acid and the dyestuff of the formula

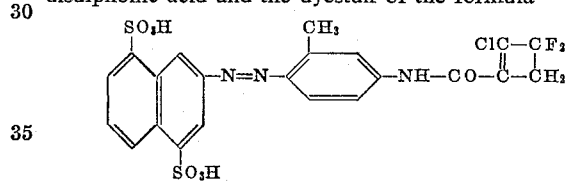

was obtained. From an alkaline bath it produced on cotton a reddish yellow dyeing.

When printing a cotton fabric with a neutral printing colour, passing the printed material through an alkaline bath and then steaming it for a short time, a reddish yellow print of good fastness properties was obtained.

*Example 9*

25.1 parts of 2-amino-5-hydroxynaphthalene-7-sulphonic acid of 95% strength were acylated in the manner described in Example 7 with 25.7 parts of 1,2,2-trichloro-3,3-difluorocyclobutane carboxylic acid chloride-1 and coupled with the diazo compound which had been prepared under the conditions described in Example 1 from 24.6 parts of 1-aminobenzene-2-sulphonic acid of 70% strength. A dyestuff of the formula

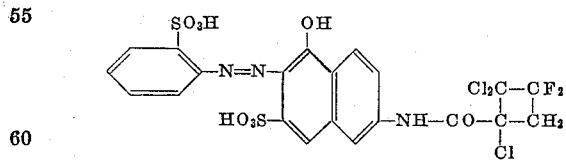

was obtained. From an alkaline bath it produced on cotton an orange-coloured dyeing of good fastness to wetting.

When printing a fabric of artificial wool with a neutral printing colour and treating the printed fabric for a short time at about 95° C. in an alkaline bath containing sodium carbonate and sodium chloride, an orange-coloured print of good fastness to washing was obtained.

*Example 10*

25.3 parts of 2-methylamino-5-hydroxynaphthalene-7-sulphonic acid were reacted with 22.3 parts of 2,2-dichloro-3,3-difluorocyclobutane carboxylic acid chloride-1 under the conditions described in Example 7. The resulting product was coupled with 18.7 parts of diazotized 4- methyl-1-aminobenzene-2-sulphonic acid. A dyestuff of the formula

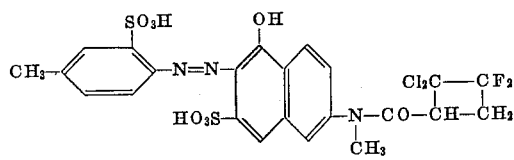

was obtained. From a nalkaline bath it produced on cotton a red dyeing of very good fastness to wetting.

When printing a cotton fabric in the presence of urea and sodium carbonate as an alkali, heat-setting the dyestuff for a short time at 195° C. and continuing the treatment in the usual manner, a red print of good fastness properties was obtained.

*Example 11*

39 parts of 1-amino-8-hydroxynaphthalene-3,6-disulphonic acid of 79.3% strength were reacted under the conditions described in Example 1 with 18.6 parts of 2-chloro-3,3-difluorocyclobutene - 1 - yl-carboxylic acid chloride-1 and coupled with the diazonium compound which had been prepared under known conditions from 9.3 parts of aniline with hydrochloric acid and sodium nitrite solution.

A dyestuff of the formula

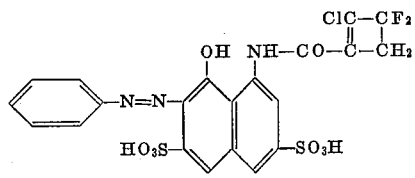

was obtained. From an alkaline bath it produced on cotton a red dyeing of very good fastness to wetting.

When printing a fabric of viscose rayon with a printing colour which contianed potassium bicarbonate as an alkali in addition to the dyestuff, steaming in a usual continue steamer and finishing the print in the usual manner, a clear red print of good fastness properties was obtained.

*Example 12*

10.7 parts of 3-methyl-1-aminobenzene were reacted under the conditions described in Example 8 with 25.7 parts of 1,2,2-trichloro-3,3-difluorocyclobutane carboxylic acid chloride-1.

37.5 parts of 4-amino-1,1'-azobenzene-2,4'-disulphonic acid were diazotized in known manner and coupled at pH 4.5 to 5.5 with the solution of 1-(3',3'-difluoro-2',2',1'-trichlorocyclobutyl - carbonylamino) - 3 - methylbenzene which had been prepared as described above. A dyestuff of the formula

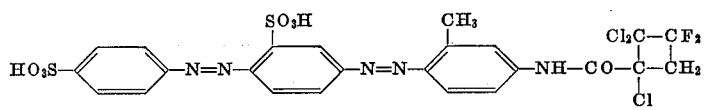

was obtained. From an alkaline bath it produced on cotton a yellowish brown dyeing of good fastness to wetting.

When printing a cotton fabric with a neutral printing colour, passing the printed material through a cold, salt-containing alkaline bath and fixing the dyestuff immediately by steaming in a two phase steamer, a yellow brown print of very good fastness to wetting was obtained.

*Example 13*

25.1 parts of 1-amino-8-hydroxynaphthalene-3,6-disulphonic acid of 95% strength were acylated in the manner described in Example 7 with 25.7 parts of 1,2,2-trichloro-3,3-difluorocyclobutane carboxylic acid chloride-1. The resulting product was coupled at a pH of 5 to 6 with the diazo compound which had been obtained from 22.3 parts of 2-amino-naphthalene-1-sulphonic acid. A dyestuff of the formula

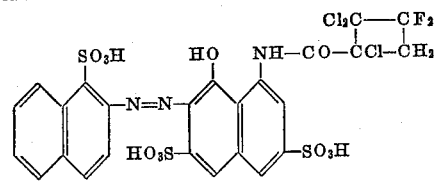

was obtained. From an alkaline bath it produced on cellulose fibres a bluish red dyeing of very good fastness to wetting.

When printing a cotton fabric with a printing colour which contained sodium carbonate as an alkali in addition to the dyestuff and heat-setting the printed fabric at 190° C., a bluish red print of very good fastness to wetting was obtained.

*Example 14*

20 parts of 1,4-diaminobenzene-2-sulphonic acid of 94% strength were adjusted to a pH value of 8 by means of an aqueous 2 N-sodium carbonate solution. Then 22.3 parts of 2,2-dichloro-3,3-difluorocyclobutane carboxylic acid chloride-1 which were dissolved in 50 parts by volume of acetone were added dropwise at room temperature. By the simultaneous addition of further drops of 2 N-sodium carbonate solution the pH value was maintained within the range of 7.5 to 8. After the addition of 50 parts by volume of 2 N-sodium nitrite solution the mixture was added dropwise, while cooling, to a mixture of 60 parts by volume of concentrated hydrochloric acid and 65 parts by volume of water, the addition being brought about in such a manner that the temperature did not exceed 3° C.

39 parts of 1-amino-8-hydroxynaphthalene-3,6-disulphonic acid of 79.3% strength were reacted under the conditions described in Example 1 with 18.6 parts of 2-chloro-3,3-difluorocyclobutene-1-yl-carboxylic acid chloride-1 and coupled at pH 5 to 6 with the diazo compound prepared as described above.

A dyestuff of the formula

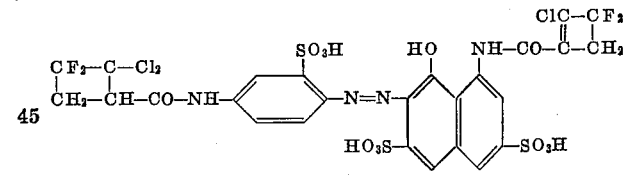

was obtained. From an alkaline bath it produced on cotton a violet-tinged red dyeing of very good fastness to wetting.

When printing a fabric of artificial wool with a printing colour containing sodium carbonate as an alkali and urea in addition to the dyestuff and heat-setting the printed fabric at 150° C., a violet-tinged red print of very good fastness to wetting was obtained.

*Example 15*

25 parts of 2-amino-8-hydroxynaphthalene-6-sulphonic acid were dissolved in 2 N-sodium carbonate solution until the pH value was 8. Then 21.5 parts of 4,4-dimethyl-2-chloro-3,3-difluorocyclobutene-1,2-carboxylic acid chloride-1 which had been dissolved in 50 parts by volume of acetone were added dropwise at a temperature within the range of 40 to 45° C. Simultaneously 2 N-sodium carbonate solution was added in such an amount that during the reaction the pH value remained within the range of 7.5 to 8. Stirring was continued for 10 minutes. The mixture was cooled to room temperature and acidified until its pH was within the range of 4 to 5.

17 parts of 1-aminobenzene-2-sulphonic acid were placed into a vessel together with 100 parts by volume of water and 20 parts by volume of hydrochloric acid (d.=1.18). At a temperature of 0 to 2° C., 100 parts by volume of 1 N-sodium nitrite solution were added dropwise. Stirring was continued for about 15 minutes. The excess of nitrite was removed by means of solid amidosulphonic acid and the diazo suspension was added dropwise to the coupling component at a temperature of 0 to 4° C. in the course of 5 minutes. The pH value was adjusted to 5 by means of solid anhydrous sodium carbonate. The mixture was stirred for 30 minutes. Then the pH value was adjusted to 6.5 by means of anhydrous sodium carbonate and the mixture was stirred for one hour. 200 parts of sodium chloride were added per 1000 parts by volume of reaction solution and then the pH value was adjusted to about 7.5 by means of anhydrous sodium carbonate. After stirring for one hour the pH value was adjusted to 4 by means of mineral acid and the resulting dyestuff was filtered in the cold.

The dyestuff obtained had the formula

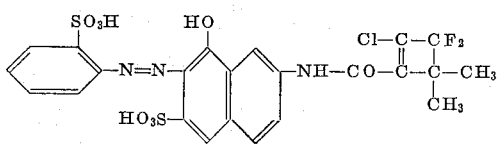

On cotton the dyestuff produced a scarlet dyeing of very good fastness to washing and fastness to cross-dyeing in an acid medium.

We claim:
1. A water-soluble azo-dyestuff of the formula

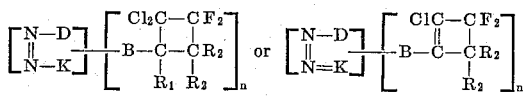

in which D is a benzene, azobenzene or naphthalene diazo component, K is a hydroxybenzene, hydroxynaphthalene, pyrazolone, barbituric acid or acetoacetylaminobenzene coupling component, at least one of D and K having at least one sulfonic acid or carboxylic acid substituent, $R_1$ is hydrogen, chlorine or lower alkyl, $R_2$ is hydrogen or lower alkyl, B is a

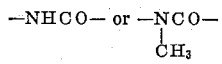

bridge, and $n$ is 1 or 2.

2. The dyestuff of the formula

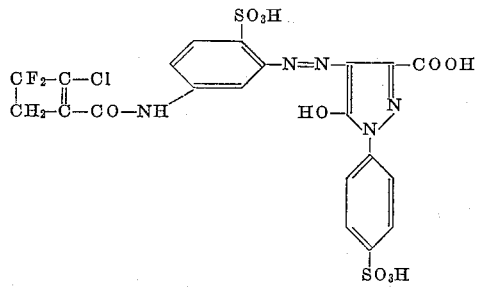

3. The dyestuff of the formula

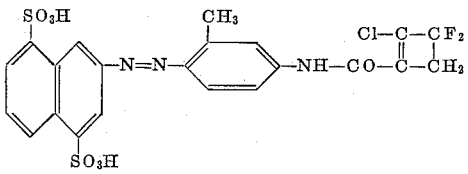

4. The dyestuff of the formula

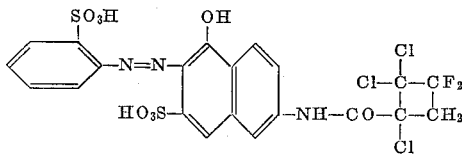

5. The dyestuff of the formula

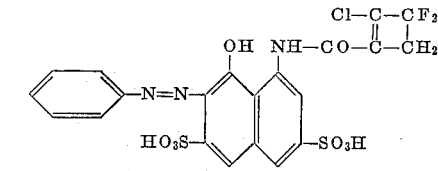

6. The dyestuff of the formula

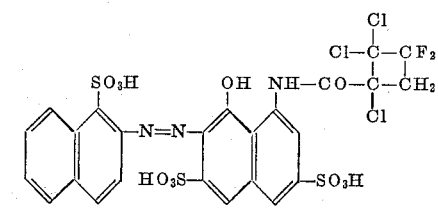

References Cited
UNITED STATES PATENTS

| | | | |
|---|---|---|---|
| 2,700,686 | 1/1955 | Dickey et al. | 260—196 X |
| 3,278,516 | 11/1966 | Scherer et al. | 260—163 |
| 3,278,549 | 11/1966 | Scherer et al. | 260—314.5 |

FLOYD D. HIGEL, *Primary Examiner.*